(12) United States Patent
Claes et al.

(10) Patent No.: US 10,451,821 B2
(45) Date of Patent: Oct. 22, 2019

(54) PHOTONIC CIRCUIT LIGHT COUPLER

(71) Applicants: IMEC VZW, Leuven (BE); Samsung Electronics Co. Ltd., Suwon-si, Gyeonggi-do (KR)

(72) Inventors: Tom Claes, Merelbeke (BE); Rita Van Hoof, Geetsbets (BE); Gillis Winderickx, Haacht (BE)

(73) Assignees: IMEC VZW, Leuven (BE); SAMSUNG ELECTRONICS CO. LTD., Suwon-Si (KR)

( * ) Notice: Subject to any disclaimer, the term of this patent is extended or adjusted under 35 U.S.C. 154(b) by 0 days.

(21) Appl. No.: 15/831,565

(22) Filed: Dec. 5, 2017

(65) Prior Publication Data

US 2018/0156991 A1    Jun. 7, 2018

(30) Foreign Application Priority Data

Dec. 5, 2016 (EP) .................................... 16202279

(51) Int. Cl.
*G02B 6/42* (2006.01)
*G01J 3/02* (2006.01)
(Continued)

(52) U.S. Cl.
CPC ............ *G02B 6/4214* (2013.01); *G01J 3/021* (2013.01); *G01J 3/0218* (2013.01); *G01J 3/0259* (2013.01);
(Continued)

(58) Field of Classification Search
CPC ............. G02B 6/4214; G02B 6/12007; G02B 6/1228; G02B 6/13; G02B 6/425;
(Continued)

(56) References Cited

U.S. PATENT DOCUMENTS 4,990,465 A * 2/1991 Liau ...................... H01S 5/0201
                                                    148/DIG. 161
5,170,448 A * 12/1992 Ackley .............. G02B 6/12004
                                                    385/131
(Continued)

FOREIGN PATENT DOCUMENTS

| EP | 2 112 537 A1 | 10/2009 |
| WO | 2007/139316 A1 | 12/2007 |
| WO | 2015/128503 A1 | 9/2015 |

OTHER PUBLICATIONS

Li, Gen; A study of ultrahigh speed optical integrated circuits on Si substrate, Dissertation, Kanazawa University, 2015 (Year: 2015).*

(Continued)

*Primary Examiner* — Peter Radkowski
(74) *Attorney, Agent, or Firm* — McDonnell Boehnen Hulbert & Berghoff LLP

(57) ABSTRACT

An example embodiment relates to a photonic integrated circuit device and a method for its manufacture. An example device includes a planar detector having at least one photodetector. The device may further include a waveguide layer arranged substantially parallel to the planar detector, the waveguide layer including a first integrated waveguide for guiding a first light signal. A cavity may be formed in the waveguide layer in a region spaced away from the edges of the waveguide layer such as to terminate the first integrated waveguide in that region. A first reflective surface may be provided in the cavity to reflect the first light signal guided by the first integrated waveguide toward a first photodetector of the planar detector.

13 Claims, 6 Drawing Sheets

(51) Int. Cl.
   *G01J 3/28* (2006.01)
   *G02B 6/12* (2006.01)
   *G02B 6/122* (2006.01)
   *G02B 6/13* (2006.01)
(52) U.S. Cl.
   CPC ........... *G01J 3/2803* (2013.01); *G01J 3/2823* (2013.01); *G02B 6/12007* (2013.01); *G02B 6/1228* (2013.01); *G02B 6/13* (2013.01); *G02B 6/425* (2013.01); *G01J 2003/2813* (2013.01); *G02B 2006/12147* (2013.01)
(58) Field of Classification Search
   CPC ........ G01J 3/021; G01J 3/0218; G01J 3/0259; G01J 3/2803; G01J 3/2823
   See application file for complete search history.

(56) References Cited

U.S. PATENT DOCUMENTS

| | | | | |
|---|---|---|---|---|
| 5,239,600 A * | 8/1993 | Handa | | G02B 6/125 385/48 |
| 5,357,122 A * | 10/1994 | Okubora | | G02B 6/43 257/432 |
| 6,226,083 B1 * | 5/2001 | Schwerzel | | G01J 3/0259 356/300 |
| 6,563,997 B1 * | 5/2003 | Wu | | G02B 6/122 385/129 |
| 6,661,939 B2 * | 12/2003 | Kaneko | | G02B 6/4214 385/129 |
| 6,741,781 B2 * | 5/2004 | Furuyama | | G02B 6/125 385/129 |
| 6,801,679 B2 * | 10/2004 | Koh | | G02B 6/12004 213/24 |
| 6,829,398 B2 * | 12/2004 | Ouchi | | G02B 6/1221 385/129 |
| 6,968,109 B2 * | 11/2005 | Furuyama | | G02B 6/125 385/129 |
| 7,079,741 B2 * | 7/2006 | Furuyama | | G02B 6/125 385/129 |
| 7,095,537 B2 * | 8/2006 | Shih | | G02B 6/2931 359/15 |
| 7,112,885 B2 * | 9/2006 | Chen | | H05K 1/0274 257/722 |
| 7,298,941 B2 * | 11/2007 | Palen | | G02B 6/4206 264/1.1 |
| 7,444,041 B1 * | 10/2008 | Chen | | H05K 1/0274 257/722 |
| 7,457,491 B2 * | 11/2008 | Chen | | H05K 1/0274 257/722 |
| 7,529,448 B2 * | 5/2009 | Chen | | H05K 1/0274 257/722 |
| 7,916,986 B2 * | 3/2011 | Zhang | | C23C 16/30 216/2 |
| 8,320,228 B2 * | 11/2012 | Kato | | G11B 7/124 369/112.09 |
| 8,655,118 B2 * | 2/2014 | Khan | | G02B 6/1221 385/14 |
| 8,744,220 B2 * | 6/2014 | Khan | | G02B 6/1221 385/14 |
| 8,854,624 B2 * | 10/2014 | Pervez | | G01J 3/02 356/402 |
| 9,042,696 B2 * | 5/2015 | Heck | | G02B 6/12004 385/129 |
| 9,081,160 B2 * | 7/2015 | Terada | | G02B 6/1228 |
| 9,086,551 B2 * | 7/2015 | Heroux | | G02B 6/4215 |
| 9,202,951 B2 * | 12/2015 | Pagani | | H01L 31/02327 |
| 9,366,571 B2 * | 6/2016 | Pervez | | G01J 3/02 |
| 2002/0037138 A1 * | 3/2002 | Kaneko | | G02B 6/4214 385/49 |
| 2002/0039475 A1 * | 4/2002 | Furuyama | | G02B 6/125 385/129 |
| 2003/0039455 A1 * | 2/2003 | Ouchi | | G02B 6/1221 385/88 |
| 2003/0113067 A1 * | 6/2003 | Koh | | G02B 6/12004 385/48 |
| 2004/0151462 A1 * | 8/2004 | Furuyama | | G02B 6/125 385/129 |
| 2004/0240014 A1 * | 12/2004 | Shih | | G02B 6/2931 359/35 |
| 2005/0046011 A1 * | 3/2005 | Chen | | H05K 1/0274 257/705 |
| 2005/0226583 A1 * | 10/2005 | Furuyama | | G02B 6/125 385/129 |
| 2006/0239605 A1 * | 10/2006 | Palen | | G02B 6/4206 385/14 |
| 2007/0013061 A1 * | 1/2007 | Chen | | H05K 1/0274 257/728 |
| 2007/0063342 A1 * | 3/2007 | Chen | | H05K 1/0274 257/728 |
| 2008/0273830 A1 * | 11/2008 | Chen | | H05K 1/0274 385/14 |
| 2009/0103582 A1 * | 4/2009 | Khan | | G02B 6/1221 372/45.01 |
| 2009/0232449 A1 * | 9/2009 | Zhang | | C23C 16/30 385/31 |
| 2010/0128578 A1 * | 5/2010 | Kato | | G11B 7/124 369/13.24 |
| 2010/0201011 A1 * | 8/2010 | Khan | | G02B 6/1221 264/1.24 |
| 2012/0155820 A1 * | 6/2012 | Heck | | G02B 6/12004 385/129 |
| 2012/0183009 A1 * | 7/2012 | Adachi | | G02B 6/4214 372/99 |
| 2013/0183014 A1 * | 7/2013 | Terada | | G02B 6/1228 385/124 |
| 2014/0001493 A1 * | 1/2014 | Pagani | | H01L 31/02327 257/84 |
| 2015/0117811 A1 * | 4/2015 | Heroux | | G02B 6/4215 385/14 |

OTHER PUBLICATIONS

European Search Report, European Patent Application No. 16202279. 2, dated Jun. 26, 2017, 16 pages.
Muellner, Paul et al., "CMOS-Compatible Low-Loss Silicon Nitride Waveguide Integration Platform for Interferometric Sensing", 18th European Conference on Integrated Optics, May 18-20, 2016, 2 pages.

* cited by examiner

PHOTONIC CIRCUIT LIGHT COUPLER

CROSS-REFERENCE TO RELATED APPLICATIONS

The present application is a non-provisional patent application claiming priority to European Patent Application No. 16202279.2, filed Dec. 5, 2016, the contents of which are hereby incorporated by reference.

FIELD OF THE DISCLOSURE

The disclosure relates to the field of photonic integrated circuit devices. More specifically it relates to an integrated photonic device in which a light signal is coupled from an integrated waveguide to a planar detector comprising at least one photodetector, such as an image detector, and methods related thereto.

BACKGROUND

In integrated photonic devices, such as integrated spectrometers, a photonic circuit may be provided on an image detector. For example, a plurality of grating couplers may couple light from a waveguide towards an image detector for detection.

For example, U.S. Pat. No. 6,226,083 discloses an integrated-optic spectrometer for analyzing the composition of light reflected off a sample under analysis. The integrated-optic spectrometer comprises a waveguide, fabricated onto an oxidized substrate, and an array of diffraction gratings and a detector array. The detector array is mounted on the waveguide to receive the light of different wavelengths diffracted by the grating array, e.g. such as to enable the analysis of different discrete wavelengths. The diffraction gratings each comprise a series of grating lines and are constructed to provide transmission of wavelengths not diffracted by the diffraction grating. The input light is guided through the waveguide and discrete wavelengths are diffracted by the diffraction gratings onto the photodiode detector array which in turn measures the intensity of the light at the discrete wavelengths for determining composition, while transmitting non-diffracted wavelengths through the waveguide.

In such a system, the diffraction gratings may have the shape of a square or rectangle, with grating lines at right angles to the direction of propagation of light within the waveguide, resulting in the light being coupled out of the waveguide in a direction that is about perpendicular to the plane of the waveguide, e.g. toward the photodiode detector array.

However, it is a disadvantage of such systems that each grating coupler may typically have a low out-coupling efficiency. Furthermore, this may adversely affect the signal to noise ratio for the signal detected by the individual pixels. It is known that, to increase the coupling efficiency of a grating coupler, its length may need to be increased. However, this implies that also the photodiode detector array should be chosen such that the individual detector pixel elements of the array are sufficiently large, e.g. such that the length of the gratings about matches the pixel pitch. This may put large constraints on the choice of imager from commercially available imaging solutions, or might even require the development of expensive custom arrays.

SUMMARY

Some embodiments may provide for an increased efficiency of light detection, e.g. relative to an integrated photonic device for coupling light from a waveguide to a planar detector.

Some embodiments may provide for a high coupling efficiency between an integrated waveguide, e.g. a single integrated waveguide, and a corresponding photodetector of a planar detector, e.g. a pixel of an image detector, e.g. a single corresponding pixel.

This coupling may be achieved efficiently in an integrated device, e.g. between a first plane corresponding to a layer in which the integrated waveguide is implemented and a second plane corresponding to the orientation of an image detector comprising the pixel, e.g. in which the first plane and the second plane are substantially parallel with respect to each other.

Some embodiments may allow light to be coupled efficiently from a waveguide to a detector, e.g. a pixel of an image detector, while allowing the waveguide and the image detector to be co-integrated in a small form factor integrated device.

Some embodiments may allow a photonic chip to be realized in which a large number, e.g. millions, of photonic waveguide outputs can be transduced by corresponding image detector pixels on the same chip.

Some embodiments may allow for a larger efficiency for coupling light out of a waveguide when compared to an output grating coupler, e.g. about twice as efficient or even a higher efficiency.

Some embodiments may provide a compact device, e.g. in which an efficient output light coupler of only a few micrometers in diameter is provided for directing light out of a waveguide, e.g. that may have a footprint area of about 15 square micrometers.

Some embodiments may allow for a low level of noise to be achieved by coupling a large portion of the power of a light signal transmitted by a waveguide into a single pixel.

Some embodiments may provide a broadband output light coupler in an integrated system to couple light from a waveguide to a pixel, e.g. coupling light in a large wavelength range.

Some embodiments may provide a light coupler in a photonic integrated circuit device using standard integrated circuit process steps.

In a first aspect, the present disclosure relates to a photonic integrated circuit device that comprises a planar detector, e.g. an image detector, comprising at least one photodetector, e.g. an array of pixels. The device further comprises a waveguide layer arranged substantially parallel, e.g. parallel within manufacturing tolerances, e.g. parallel, to the planar detector. The waveguide layer comprises a first integrated waveguide for guiding a first light signal. A cavity is formed in the waveguide layer in a region spaced away from the edges of the waveguide layer, e.g. from the circumferential edges of the waveguide layer circumscribing a major plane of the waveguide layer, such as to terminate the first integrated waveguide in that region. The first reflective surface is provided in the cavity such as to reflect the first light signal guided by the first integrated waveguide toward a first photodetector of the planar detector.

In a photonic integrated circuit device in accordance with embodiments of the present disclosure, the planar detector may be an image detector comprising an array of pixels, e.g. the at least one photodetector may correspond to a plurality of pixels organized in a pixel array.

In a photonic integrated circuit device in accordance with embodiments of the present disclosure, the waveguide layer may be monolithically integrated on top of the image detector.

In a photonic integrated circuit device in accordance with embodiments of the present disclosure, the image detector may be a frontside-illuminated CMOS image detector.

In a photonic integrated circuit device in accordance with embodiments of the present disclosure, the image detector may be a backside-illuminated CMOS image detector.

In a photonic integrated circuit device in accordance with embodiments of the present disclosure, the cavity may be at least partly filled with a metal plug to form the first reflective surface.

In a photonic integrated circuit device in accordance with embodiments of the present disclosure, the first reflective surface may be provided at an angle, in which this angle between a plane of the waveguide layer and a normal to the first reflective surface lies in the range of 20 degrees to 60 degrees.

In a photonic integrated circuit device in accordance with embodiments of the present disclosure, the first integrated waveguide may have a tapered section in which the width of the first integrated waveguide decreases toward the first reflective surface.

In a photonic integrated circuit device in accordance with embodiments of the present disclosure, the waveguide layer may comprise a second integrated waveguide for guiding a second light signal, the second integrated waveguide being arranged such that the cavity also terminates the second integrated waveguide in the region spaced away from the edges of the waveguide layer. A second reflective surface may be provided in the cavity to reflect the second light signal guided by the second integrated waveguide toward a second photodetector of the planar detector.

In a photonic integrated circuit device in accordance with embodiments of the present disclosure, the waveguide layer may comprise a third integrated waveguide and a fourth integrated waveguide for guiding, respectively, a third light signal and a fourth light signal. The cavity may terminate the third integrated waveguide as well as the fourth integrated waveguide. A third reflective surface and a fourth reflective surface may be provided in the cavity to reflect respectively the third light signal and the fourth light signal when guided by, respectively, the third integrated waveguide and the fourth integrated waveguide toward, respectively, a third photodetector and a fourth photodetector of the planar detector.

In a photonic integrated circuit device in accordance with embodiments of the present disclosure, the first integrated waveguide, the second integrated waveguide, the third integrated waveguide and the fourth integrated waveguide may be arranged in a cross shape, in which the cavity is formed in the intersection of this cross shape.

In a photonic integrated circuit device in accordance with embodiments of the present disclosure, the first integrated waveguide, the second integrated waveguide, the third integrated waveguide and the fourth integrated waveguide may be arranged parallel to each other. The first integrated waveguide and the second integrated waveguide may be arranged in line with each other and the third integrated waveguide and the fourth integrated waveguide may be arranged in line with each other. The cavity may comprise an elongate trench terminating the first, second, third and fourth integrated waveguides.

In a photonic integrated circuit device in accordance with embodiments of the present disclosure, the elongate trench may be oriented perpendicular to the first, second, third and fourth integrated waveguides. The first integrated waveguide and the second integrated waveguide may lie at opposite sides of the elongate trench. The third integrated waveguide and the fourth integrated waveguide may lie at opposite sides of the elongate trench.

A photonic integrated circuit device in accordance with embodiments of the present disclosure may comprise at least one light input coupler for coupling an input optical signal into the first, second, third and/or fourth integrated waveguide. The or each light input coupler, e.g. each of the at least one light input coupler, may be adapted for coupling light incident on the waveguide layer into integrated waveguide segments that lie at opposite sides of the light input coupler.

In a photonic integrated circuit device in accordance with embodiments of the present disclosure, a plurality of elongate trenches and a plurality of light input couplers may alternate in a parallel arrangement. The photonic integrated circuit device may further comprise a plurality of photonic signal processors arranged in, and/or functionally coupled to, the integrated waveguides to manipulate the spectrum of the light travelling through the integrated waveguide between a light input coupler and an elongate trench.

In a second aspect, the present disclosure also relates to a method for manufacturing a photonic integrated circuit device. The method comprises providing a layer stack that comprises a buried oxide layer, a waveguide layer and a cladding layer, in which the waveguide layer comprises a first integrated waveguide for guiding a first light signal. The method further comprises forming a cavity in the waveguide layer in a region spaced away from the edges of the waveguide layer such as to terminate the first integrated waveguide in that region. The method also comprises providing a first reflective surface in the cavity, and arranging the layer stack on a planar detector, e.g. an image detector, that comprises at least one photodetector, e.g. an array of pixels, such as to align the first reflective surface to reflect the first light signal when guided by the first integrated waveguide toward a first photodetector, e.g. a first pixel, of the planar detector.

In a method in accordance with embodiments of the present disclosure, the cavity may comprise a sloped semiconductor oxide etching process for etching from a top surface formed by the cladding layer toward the buried oxide layer and through the waveguide layer.

In a method in accordance with embodiments of the present disclosure, providing the first reflective surface in the cavity may comprise depositing a seed layer on at least the walls of the cavity, filling the cavity with a metal plating, e.g. a plating metal, over the seed layer and applying a planarization process to a top surface formed by the metal such as to remove parts of the plating metal and the seed layer extending outside the cavity.

In another aspect, the present disclosure also relates to a spectrometer comprising a photonic integrated circuit device in accordance with embodiments of the first aspect of the present disclosure.

Some aspects of the disclosure are set out in the accompanying independent and dependent claims. Features from the dependent claims may be combined with features of the independent claims and with features of other dependent claims as appropriate and not merely as explicitly set out in the claims.

These and other aspects of the disclosure will be apparent from and elucidated with reference to the embodiment(s) described hereinafter.

BRIEF DESCRIPTION OF THE FIGURES

The above, as well as additional, features will be better understood through the following illustrative and non-limiting detailed description of example embodiments, with reference to the appended drawings.

Figure 1:
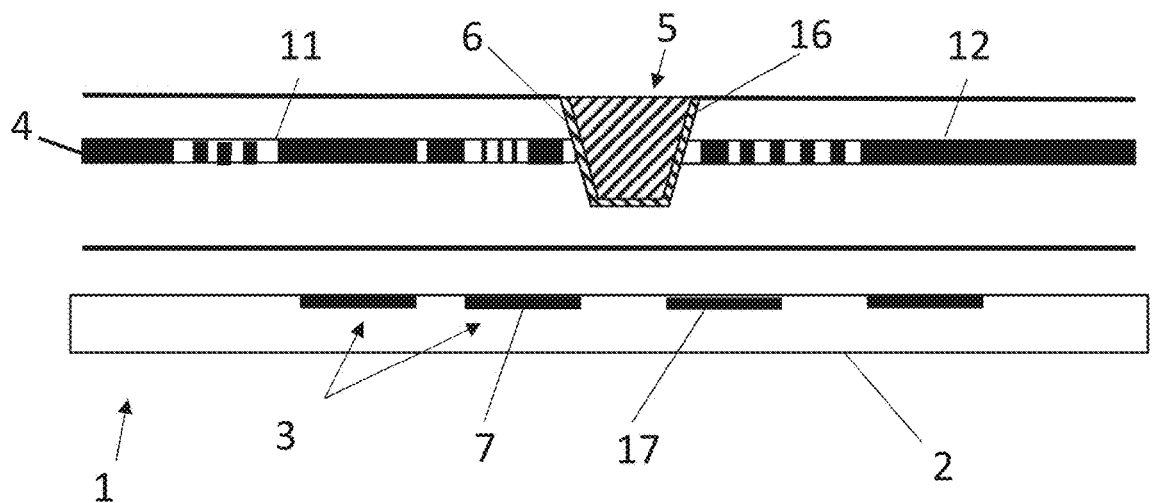
FIG. 1 illustrates a device, according to an example embodiment.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under some circumstances and that the embodiments of the disclosure described herein are capable of operation in other sequences than described or illustrated herein.

Moreover, the terms top, under and the like in the description and the claims are used for descriptive purposes and not necessarily for describing relative positions. It is to be understood that the terms so used are interchangeable under some circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of example embodiments, various features of the disclosure are sometimes grouped together in a single embodiment, figure, or description thereof for the purpose of streamlining the disclosure and aiding in the understanding of one or more of the various aspects. This method of disclosure, however, is not to be interpreted as reflecting an intention that the claims require more features than are expressly recited in each claim. Rather, as the following claims reflect, some aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments may be practiced without these specific details. In other instances, some methods, structures and techniques have not been shown in detail in order not to obscure an understanding of this description.

In a first aspect, the present disclosure relates to a photonic integrated circuit device comprising a planar detector comprising at least one photodetector, e.g. an image detector that comprises a plurality of pixels, for example a plurality of pixels forming an array of pixels. The photonic integrated circuit device further comprises a waveguide layer arranged substantially parallel to the planar detector, e.g. parallel to the planar detector, e.g. parallel to the image detector. The waveguide layer comprises at least a first integrated waveguide for guiding at least a first light signal. A cavity is formed is the waveguide layer in a region spaced away from the edges of the waveguide layer such as to terminate the first integrated waveguide in this region. A reflective surface is provided in the cavity to reflect the first light signal when guided by the first integrated waveguide toward a first photodetector of the planar detector.

Referring to FIG. 1, a photonic integrated circuit device 1, according to some embodiments, is shown. The photonic integrated circuit device 1 comprises a planar detector 2 comprising at least one photodetector 3. For example, the planar detector may comprise at least one semiconductor device layer comprising at least one photodetector configured for transducing light into an electronic signal. For example, the planar detector may be planar, e.g. comprising a planar device layer or layer stack, and may be adapted for detecting light by the at least one photodetector implemented therein. For example, the device may comprise an image detector that comprises an array of pixels.

The photonic integrated circuit device further comprises a waveguide layer 4 arranged substantially parallel to the planar detector, e.g. arranged parallel to the planar detector.

For example, the waveguide layer may be arranged substantially parallel to the array of pixels, e.g. parallel to the array of pixels, e.g. parallel to a major plane of the image detector.

Figure 3:
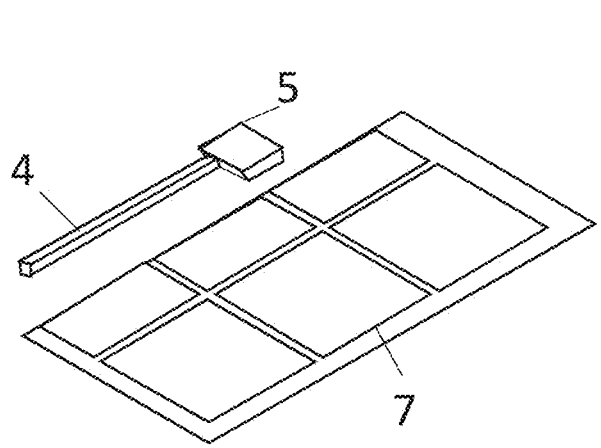
FIG. 3 illustrates a device that comprises a backside-illuminated image detector, according to an example embodiment.
Figure 4:
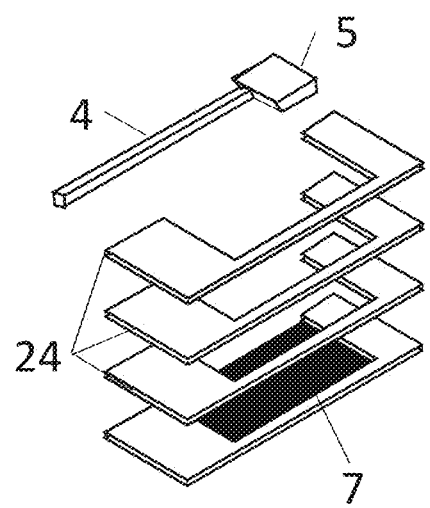
FIG. 4 illustrates a device that comprises a frontside-illuminated image detector, according to an example embodiment.

The image detector may for example comprise a CMOS image detector. The image detector may be a frontside-illuminated imager, e.g. may comprise metal contacts above the active pixel area, e.g. metal contact layers arranged in between the active pixel area and the waveguide layer, such as illustrated in FIG. 4, or the image detector may be backside-illuminated imager, e.g. which does not have metal contacts above the active pixel area, such as illustrated in FIG. 3. The image detector may be monolithically integrated in the device, e.g. the waveguide layer may be monolithically integrated on top of the image detector.

Figure 2:
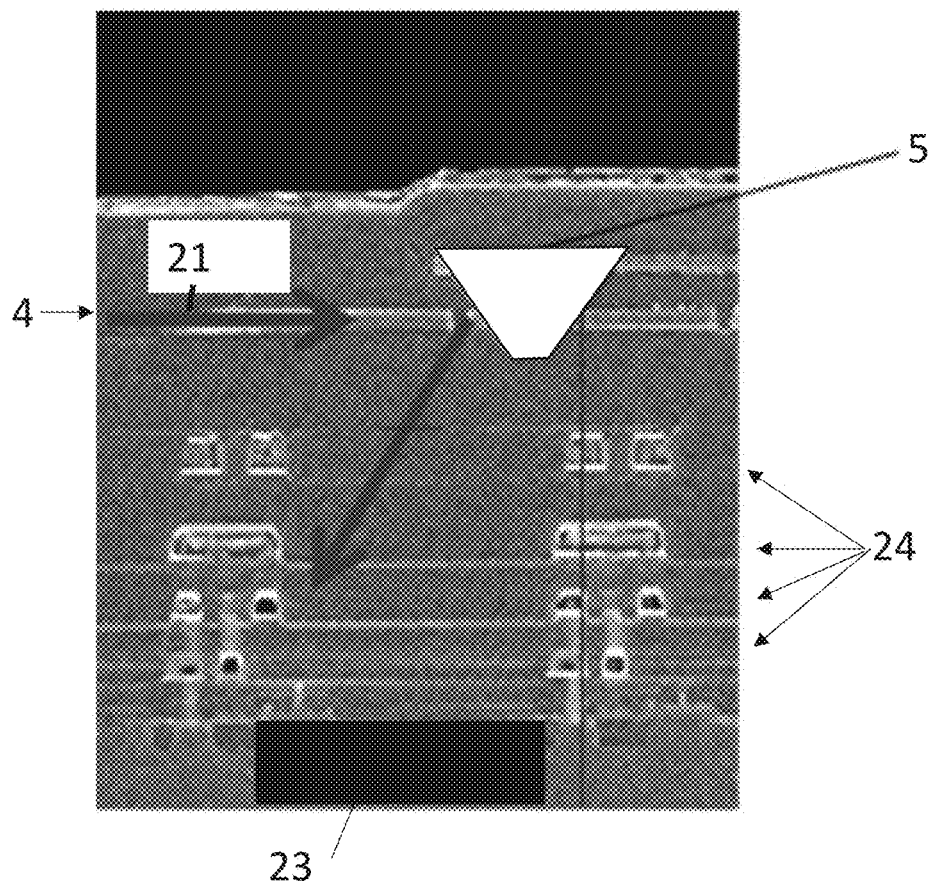
FIG. 2 shows a cross-sectional drawing of a copper sloped output mirror formed by a metal plug on a scanning electron cross-sectional micrograph of an imager pixel, according to an example embodiment.

For example, FIG. 2 shows a cross-sectional drawing of a copper sloped output mirror formed by a metal plug on a scanning electron cross-sectional micrograph of an imager pixel. The arrows 21 indicate the propagation direction of the light signal in operation of the device. The active region 23 of a pixel, in this example of a front-side illuminated imager, may be positioned below a plurality of layers forming metal contacts of the imager, e.g. four layers of aluminum contacts.

Figure 5:
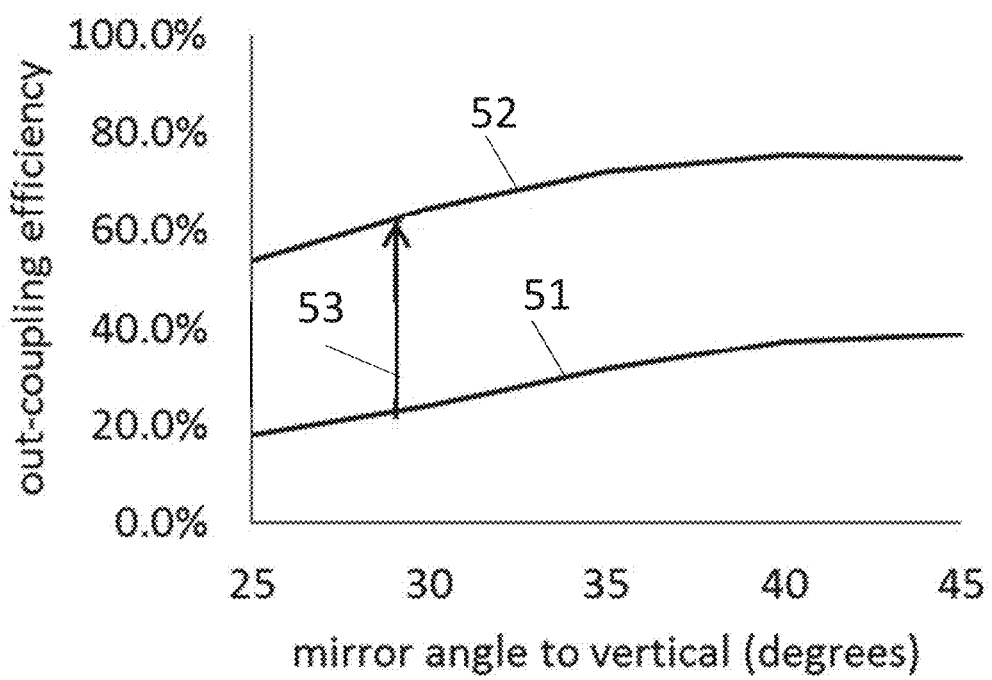
FIG. 5 shows an illustrative comparison of light outcoupling efficiency.

FIG. 5 shows, as an illustrative example, a comparison of light out-coupling efficiency, e.g. efficiency of coupling the light signal from the waveguide to the pixel, between an example embodiment comprising a frontside-illuminated imager 51 and an example embodiment comprising a backside-illuminated imager 52, showing an increase of efficiency 53 of the backside-illuminated imager embodiment with respect to the frontside-illuminated imager of about a factor 2.5.

The device may comprise a layer stack on a substrate, such as silicon on insulator wafer. For example, the layer stack may comprise a buried oxide layer BOX, such as a SiO$_2$ BOX layer, the waveguide layer and a cladding layer, such as a SiO$_2$ layer. Thus, the buried oxide layer, the waveguide layer and the cladding layer may successively overlie the substrate. The cavity may fully penetrate the waveguide layer, e.g. forming a topological hole through the waveguide layer, and may, furthermore at least partially penetrate the buried oxide layer, the cladding layer and/or the substrate.

The waveguide layer 4 comprises at least a first integrated waveguide 11 for guiding at least a first light signal. A cavity 5, e.g. a hole, trench or indentation, is formed in the waveguide layer 4 in a region spaced away from the edges of the waveguide layer such as to terminate the first integrated waveguide 11 in this region. Thus the cavity may intersect the waveguide in this region. For example the region may be spaced away from the edge of the waveguide layer by at least 5%, e.g. at least 10%, e.g. in the range of 20% to 50%, of the largest diameter of the waveguide layer.

A reflective surface 6, e.g. forming a mirror, is provided in the cavity 5 to reflect the first light signal, when guided by the first integrated waveguide 11, toward a first photodetector 7 of the planar detector, e.g. a first pixel of the array of pixels.

Thus light traveling in the waveguide may exit the waveguide, reflect off the reflective surface and travel directly to the photodetector, e.g. without further substantial deviation from its principal line of propagation, e.g. without being substantially modified by reflective, refractive or diffractive elements between the reflective surface and an active area of the photodetector.

For example, the reflective surface may be formed by a material in the cavity that has a substantially different refractive index than a light-guiding core material of the waveguide. The reflective surface may thus form an integrated sloped output mirror for reflecting power from the waveguide toward the first photodetector of the planar detector. The reflective surface may be formed by a suitable reflective material, such as a metal or metal alloy, e.g. copper, aluminum, gold, silver, titanium, tantalum, or alloys of any such metal or metals. However, in other embodiments, the reflective surface may also be formed by periodic layers of at least two different dielectric materials forming a Bragg mirror.

The cavity may be at least partly filled with a plug to form the reflective surface. For example, the cavity may be filled in with a suitable reflective fill material, such as a metal or a metal alloy, e.g. copper, aluminum, gold, silver, titanium, tantalum, or alloys of any such metal or metals. However, some embodiments may not be limited to plugs filling the cavity entirely, for example, the plug may be hollow.

In some embodiments, the reflective material may also be coated or deposited over a facet of the integrated waveguide formed by the cavity, e.g. the reflective material, e.g. a reflective metal, may be deposited on a tilted surface of the cavity.

The reflective surface 6 may be a reflective tilted surface forming a light coupler structure. The reflective tilted surface may be formed on the integrated waveguide such as to terminate the integrated waveguide in a position that is spaced away from the edges of the waveguide layer. The reflective surface may be oriented at an angle in the range of 20 degrees to 60 degrees with respect to a normal direction of the waveguide layer and positioned such as to reflect light traveling in the integrated waveguide to the first photodetector 7. For example, the reflective surface 6 may be provided at an angle with respect to the plane of the waveguide layer, e.g. with respect to a wafer plane on a front side of the wafer, in which this angle is in the range of 20° to 80°, e.g. in the range of 30° to 70°, for example, in the range 40° to 60°, e.g. 45°.

For example, FIG. 5 shows an example graph of light coupling efficiency, relating to the coupling of the light signal from the integrated waveguide to a pixel, as a function of the angle of the reflective surface relative to the normal of the waveguide layer, e.g. relative to a vertical direction in which the planar detector and the waveguide layer are stacked with respect to each other.

The reflective surface forming an integrated sloped output mirror allows for a large light coupling efficiency to be achieved, e.g. about twice as efficient when compared to a grating coupler. The light coupler may also be compact, e.g. more compact than a grating coupler known in the art. This may allow for coupling of a large fraction of the light signal to a single photodetector, e.g. a single pixel of an array. Thus, also a low signal noise can be achieved, as compared to a device where the light signal guided by a single waveguide is distributed over a plurality of pixels. A reflective surface, such as a metal reflective surface, can couple a broadband signal, e.g. a light signal comprising a large range of wavelengths can be efficiently coupled to the integrated photodetector.

In some embodiments, an amorphous silicon bridge may furthermore be provided between the waveguide and the reflective surface.

Figure 9:
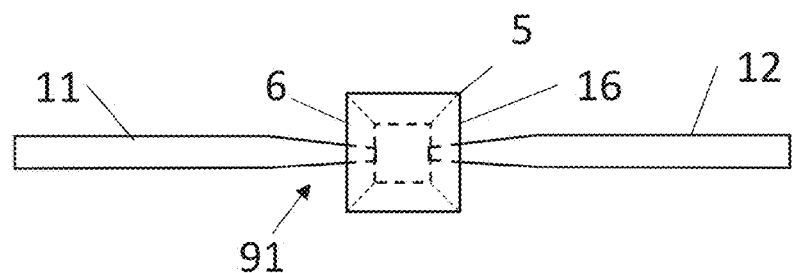
FIG. 9 shows an integrated waveguide having a tapered section of decreasing width toward a reflective surface, according to an example embodiment.

In some embodiments, the first integrated waveguide 11 may have a tapered section 91 in which the width of the first integrated waveguide decreases toward the first reflective surface 6, for example as illustrated in FIG. 9.

Furthermore, in some embodiments, the waveguide layer 4 may also comprise a second integrated waveguide 12 for guiding a second light signal. This second integrated waveguide 12 may be arranged such that the cavity also terminates the second integrated waveguide in the region spaced away from the edges of the waveguide layer.

A second reflective surface 16 may be provided in the cavity to reflect the second light signal when guided by the second integrated waveguide 12 toward a second photodetector 17 of the planar detector, e.g. a second pixel of the array of pixels.

In some embodiments, the waveguide layer may comprise a third integrated waveguide 13 and a fourth integrated waveguide 14 for guiding respectively a third light signal and a fourth light signal. The cavity 5 may be arranged such that it also terminates the third integrated waveguide 13 and the fourth integrated waveguide 14, in the region spaced away from the edges of the waveguide layer. Furthermore, a third reflective surface 26 and a fourth reflective surface 36 may be provided in the cavity to reflect respectively the third light signal and the fourth light signal when guided by respectively the third integrated waveguide and the fourth integrated waveguide toward respectively a third photodetector and a fourth photodetector of the planar detector.

For example, the first reflective surface 6, the second reflective surface 16, the third reflective surface 26 and/or the fourth reflective surface 36 may be formed by facets of a plug material in the cavity, e.g. of mirror facets of a metallic plug.

Figure 6:
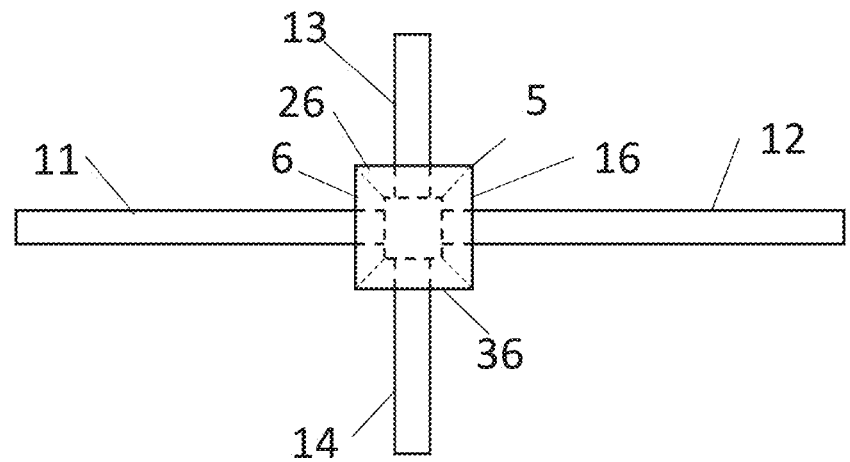
FIG. 6 shows a cavity formed in the intersection of a cross shape formed by four integrated waveguides in a device according to an example embodiment.

In some embodiments, the first, second, third and fourth integrated waveguide may be arranged in a cross shape, in which the cavity is formed in the intersection of this cross shape, for example as illustrated in FIG. 6. For example, the first integrated waveguide and the second integrated waveguide may be arranged in line with each other, e.g. in each other's linear extension, and the third integrated waveguide and the fourth integrated waveguide may be arranged in line with each other, e.g. in each other's linear extension.

Figure 7:
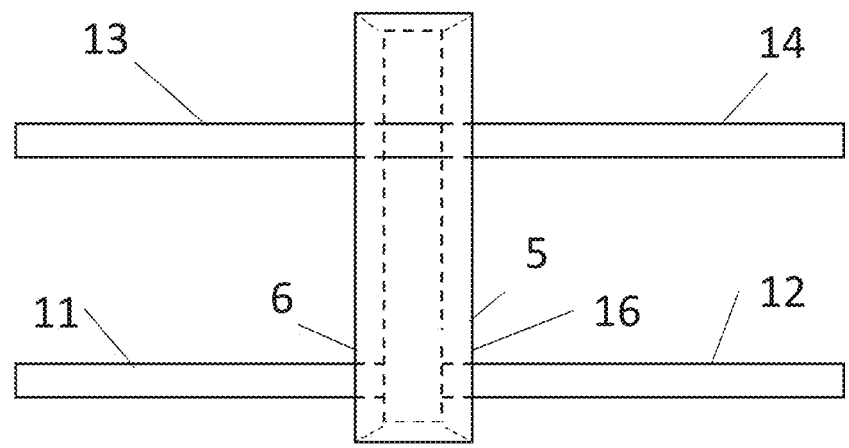
FIG. 7 shows an elongated cavity intersecting a plurality of integrated waveguides on either side of the cavity, in a device according to an example embodiment.

In some embodiments, for example as illustrated in FIG. 7, the first, second, third and fourth integrated waveguide 11,12,13,14 may be arranged parallel to each other, for example, such that the first integrated waveguide 11 and the second integrated waveguide 12 are arranged in line with each other and the third integrated waveguide 13 and the fourth integrated waveguide 14 are arranged in line with each other. The cavity 5 may comprise an elongate trench terminating the first, second, third and fourth integrated waveguide, in which reflective surfaces are provided in the elongate trench, e.g. by a plug material filling the trench or a reflective material coated or deposited on sloped walls of the trench. These reflective surfaces 6,16 may thus reflect first, second, third and fourth light signals, when guided by the corresponding integrated waveguide, toward corresponding photodetectors of the planar detector, e.g. to corresponding pixels of the array of pixels. For example, in such embodiments, the first reflective surface 6 and the third reflective surface 26 may be formed by the same facet of a material in the trench, e.g. a reflective material deposited in the trench, e.g. a metallic plug in the trench, and the second reflective surface 16 and the fourth reflective surface 36 may be formed by the same facet of the material in the trench.

Some embodiments may comprise a plurality of further waveguides, arranged in parallel, such that the elongate trench intersect the plurality of further waveguides in similar manner, directing light from the further waveguides off reflective surfaces formed in the trench to corresponding photodetectors, e.g. to corresponding pixels.

Figure 8:
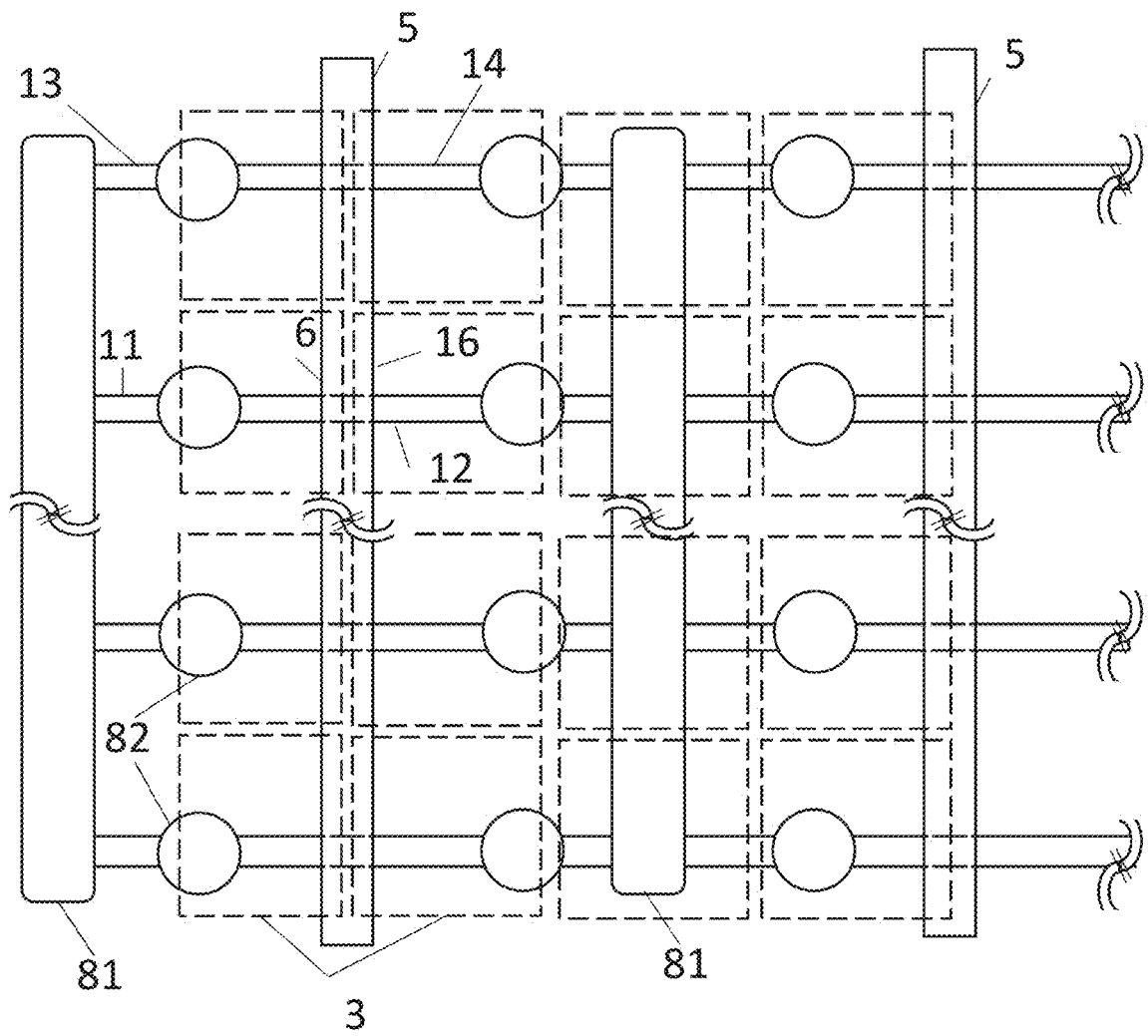
FIG. 8 an arrangement of integrated waveguides in rows and elongated cavities in columns, in a device according to an example embodiment.

The elongate trench may be oriented at an angle of at least 45°, sometimes perpendicular, to the first, second, third and fourth integrated waveguide, and, for example, also to any further integrated waveguide. Thus the integrated waveguides may be arranged in rows, while the elongate trench may be oriented in a column direction, as shown in FIG. 8.

A photonic integrated circuit device may be adapted for analyzing an input optical signal. The photonic integrated circuit device may comprise at least one light input coupler 81 for coupling the input optical signal into the first integrated waveguide, the second integrated waveguide and/or any further integrated waveguide. For example, such light input coupler 81 may comprise a grating coupler.

The at least one light input coupler may comprise a plurality of light input couplers arranged parallel to each other and substantially perpendicular to a plurality of integrated waveguides comprising the first integrated waveguide and second, third, fourth and/or further integrated waveguides as described hereinabove.

For example, in operation, a collimator of a radiation guiding system, such as for example disclosed in WO 2015/128503, may collimate the input optical signal into a collimated radiation beam and a beam shaper may distribute the power of the collimated radiation beam over a discrete number of line shaped fields, in which each line shaped field is aligned with a light input coupler 81.

Thus, the photonic integrated circuit may comprise at least one light input coupler 81 for coupling an input optical signal into the first, second, third and/or fourth integrated waveguide 11,12,13,14, wherein the, or each, light input coupler may be adapted for coupling light incident on the waveguide layer 4 into integrated waveguide segments that lie at opposite sides of the light input coupler 81, e.g. opposite sides along a direction in the plane of the waveguide layer. Thus, the or each light input coupler 81 may be adapted for coupling light incident on the waveguide layer into the integrated waveguide in two opposing directions simultaneously, e.g. into two segments of an integrated waveguide that lie at opposite sides of the light input coupler 81.

The photonic integrated circuit device may comprise a plurality of elongate trenches arranged parallel to each other and substantially perpendicular to the plurality of integrated waveguides, in which the elongate trenches form cavities in the waveguide layer to terminate the integrated waveguides. Reflective surfaces may be provided in the elongate trenches to reflect light guided by integrated waveguides toward photodetectors 3 of the planar detector, e.g. towards pixels of the array of pixels. Thus, at each crossing of the column-wise oriented trenches and the row-wise oriented integrated waveguides, light may be coupled from either side of the trench to respectively two photodetectors on either side of and below the trench.

The plurality of elongate trenches 5 forming light out-coupling structures for reflecting light signals from the integrated waveguides toward photodetectors and the plurality of light input couplers 81 for coupling input light into the integrated waveguides may alternate in a parallel arrangement, e.g. may form alternating columns. Since the elongate trenches may be adapted for reflecting light from integrated waveguides on either side the elongate trench to corresponding photodetectors, e.g. pixels, and the light input couplers may be adapted for coupling input light into waveguide segments on either side of the light input coupler, a compact and efficient light processing system can be achieved.

The photonic integrated circuit device may further comprise a plurality of photonic signal processors 82, such as resonators and/or interferometer structures, arranged in and/or functionally coupled to the integrated waveguides to manipulate the spectrum of the light travelling through the integrated waveguide between a light input coupler 81 and an elongate trench. Thus, different photodetectors may receive differently processed light signals, even when the light input couplers receive substantially the same input light.

In a second aspect, the present disclosure also relates to a light spectrum analysis system comprising a photonic integrated circuit device in accordance with embodiments of the first aspect of the present disclosure. For example, some embodiments may relate to a spectrometer, e.g. an integrated circuit spectrometer system. This spectrometer may include an photonic integrated circuit device. For example, the spectrometer may include a processor for readout of the first photodetector and/or any further photodetectors, e.g. for processing signals from a plurality of photodetectors, e.g. a plurality of pixels, of the planar detector. Furthermore, the processor may be adapted for analyzing such plurality of readout signals as function of corresponding spectral bands, e.g. different photodetectors may receive light signals that are processed to have different spectral content, e.g. by photonic signal processors provided in and/or functionally coupled to the integrated waveguides of the photonic integrated circuit device such as to manipulate the spectrum of the light travelling through the integrated waveguide. For example, analyzing the plurality of combined readout signals may comprise performing a Fourier transform spectrometric analysis method.

In a third aspect, the present disclosure also relates to a method for manufacturing a photonic integrated circuit device, such as a photonic integrated circuit device in accordance with embodiments of the first aspect of the present disclosure. The method comprises providing a layer stack, e.g. on a substrate, the layer stack comprising a buried oxide layer, a waveguide layer and a cladding layer, the waveguide layer comprising a first integrated waveguide for guiding a first light signal. The method also comprises forming a cavity in the waveguide layer in a region spaced away from the edges of the waveguide layer such as to terminate the first integrated waveguide in this region. The method further comprises providing a first reflective surface in the cavity, and arranging the layer stack on a planar detector comprising at least one photodetector, e.g. on an image detector comprising an array of pixels, such as to align the first reflective surface to reflect the first light signal when guided by the first integrated waveguide toward a first photodetector of the planar detector.

Figure 10:
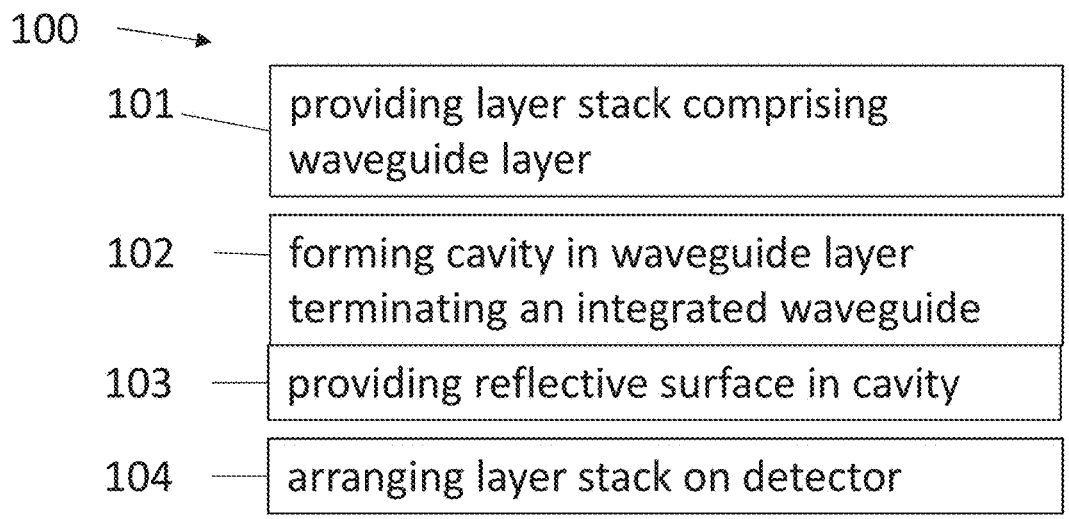
FIG. 10 illustrates an example method, according to an example embodiment.

FIG. 10 illustrates an example method 100, according to an example embodiment.

Figure 11:
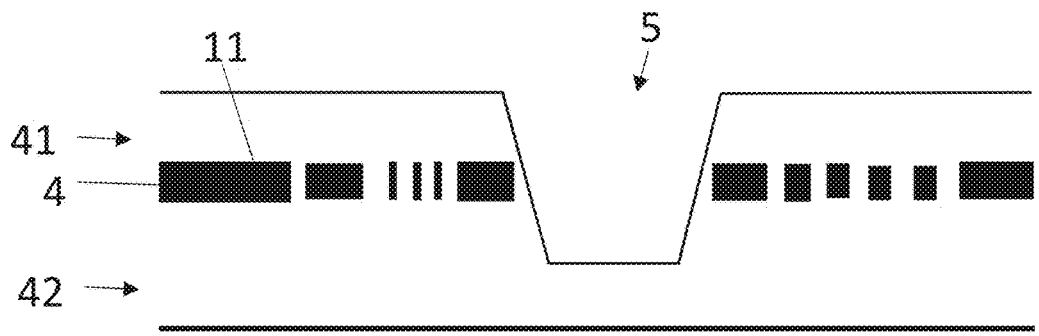
FIG. 11 shows a step of forming a cavity in a waveguide layer in a method according to an example embodiment.

Referring to FIG. 11, the method 100 for manufacturing a photonic integrated circuit device comprises a step of providing 101 a layer stack, e.g. on a substrate such as a silicon-on-insulator wafer. The layer stack comprises a buried oxide layer 42, e.g. comprising a semiconductor oxide such as $SiO_2$, a waveguide layer 4, e.g. comprising a waveguide core material such as a silicon nitride, and a cladding layer 41, e.g. comprising a semiconductor oxide such as $SiO_2$. Thus, the buried oxide layer, the waveguide layer and the cladding layer may successively overlie each other, e.g. on the substrate. As an example, the waveguide layer may have a thickness of 300 nm. The waveguide layer comprises a first integrated waveguide 11 for guiding a first light signal.

The method 100 also comprises forming 102 a cavity 5 in the waveguide layer in a region spaced away from the edges of the waveguide layer such as to terminate the first integrated waveguide in this region. For example, forming this cavity may comprise a sloped semiconductor oxide etching process. Forming the cavity may comprise etching from the top surface formed by the cladding layer toward the buried oxide layer and through the waveguide layer, e.g. etching from the top surface under an angle such as to form at least one cavity wall at an angle in the range of 20 degrees to 60 degrees with respect to the normal of the waveguide layer, e.g. relative to the vertical.

Figure 12:
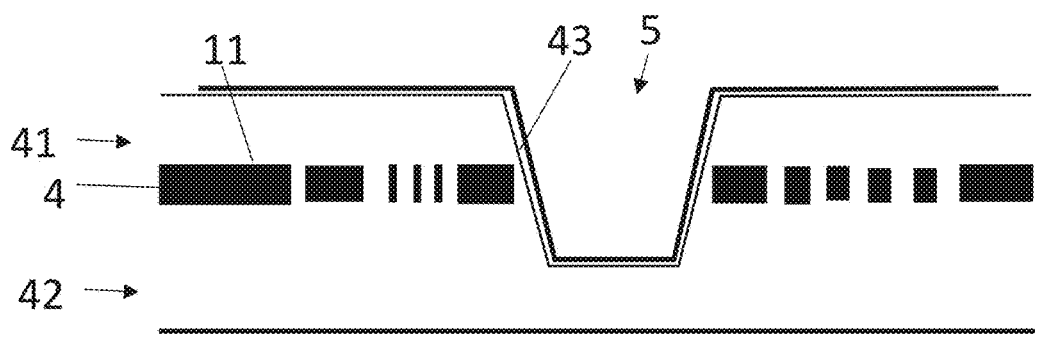
FIG. 12 shows a step of depositing a seed layer in a cavity in a method according to an example embodiment.

The method may further comprise providing 103 a first reflective surface in the cavity. For example, providing 103 the first reflective surface may comprise depositing a seed layer on the walls of the cavity 5, e.g. as illustrated in FIG. 12. For example, depositing the seed layer may comprise depositing a reflective metal seed layer, such as copper, in at the cavity, e.g. covering the walls of the cavity and the top surface of the cladding layer 41. Depositing the seed layer may comprise depositing tantalum nitride, tantalum and copper, e.g. a successive deposition of TaN, Ta and Cu. For example, the deposited seed layer may comprise a TaN layer of about 10 nm thickness, a Ta layer of about 15 nm thickness and a Cu layer of about 100 nm thickness.

Figure 13:
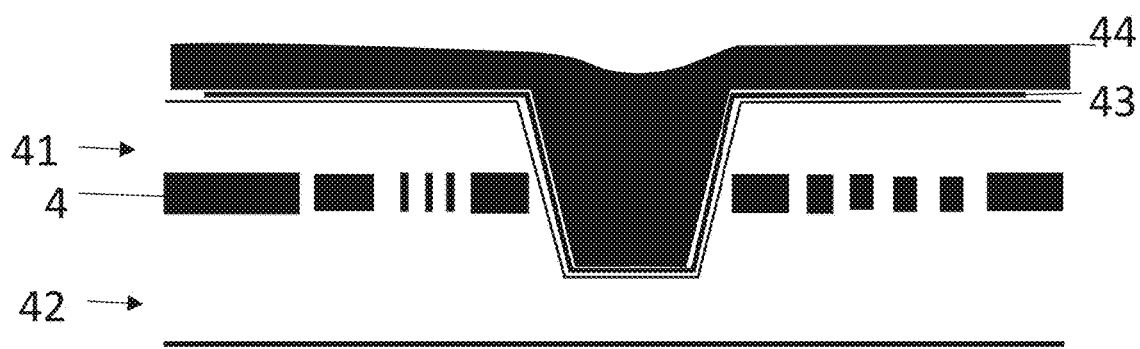
FIG. 13 shows a step of filling a cavity by metal plating, according to an example embodiment.
Figure 14:
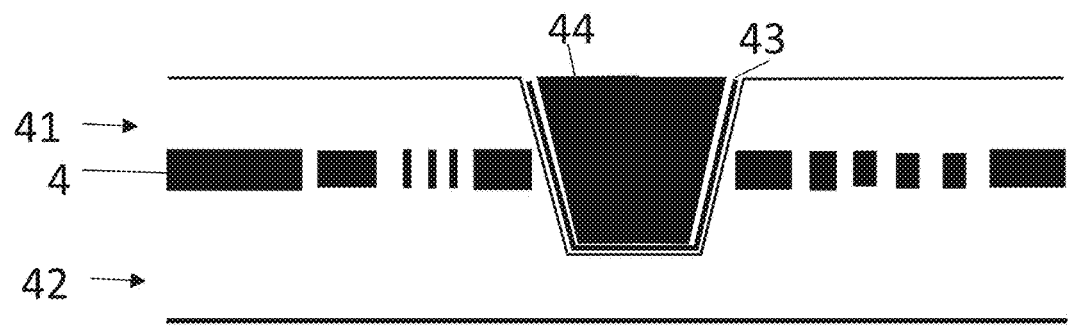
FIG. 14 shows a step of applying a planarization process to remove plating metal outside a cavity, according to an example embodiment.

Referring to FIG. 13, Providing the first reflective surface in the cavity may further comprise filling the cavity with a metal 44, e.g. over the seed layer 43. For example, providing the first reflective surface may comprise metal plating, e.g. by copper plating over the seed layer. Providing the first reflective surface may also comprise applying a planarization process, e.g. a chemical-mechanical planarization (CMP), to the top surface formed by the metal 44 over the cladding layer 41, e.g. such as to remove parts of the plating metal 44 and the seed layer 43 extending outside the cavity 5, such as illustrated in FIG. 14.

The method 100 further comprises arranging 104 the layer stack on a planar detector, such as an image detector, e.g. a frontside-illuminated CMOS image detector or a backside-illuminated CMOS image detector. This planar detector comprises at least one photodetector, e.g. an array of pixels. The waveguide layer may be arranged substantially parallel to the planar detector. Thus, the first reflective surface is aligned such as to reflect the first light signal when guided by the first integrated waveguide toward a first photodetector of the planar detector, e.g. resulting in a device as shown in FIG. 1.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A photonic integrated circuit device comprising:
   a planar detector comprising at least one photodetector;
   a waveguide layer arranged substantially parallel to, and monolithically integrated with, the planar detector, the waveguide layer comprising a first integrated waveguide for guiding a first light signal, wherein a cavity is formed in the waveguide layer in a region spaced away from the edges of the waveguide layer such as to terminate the first integrated waveguide in the region, wherein the planar detector is an image detector comprising an array of pixels, and wherein the image detector is a frontside-illuminated CMOS image detector or a backside-illuminated CMOS image detector; and
   wherein a first reflective surface is provided in the cavity to reflect the first light signal guided by the first integrated waveguide toward a first photodetector of the planar detector.

2. The photonic integrated circuit device of claim 1, wherein the cavity is at least partly filled with a metal plug to form the first reflective surface.

3. The photonic integrated circuit device of claim 1, wherein the first reflective surface is provided at an angle, the angle between a plane of the waveguide layer and a normal to the first reflective surface being in a range of 20 degrees to 60 degrees.

4. The photonic integrated circuit device of claim 1, wherein the first integrated waveguide has a tapered section in which a width of the first integrated waveguide decreases toward the first reflective surface.

5. The photonic integrated circuit device of claim 1, wherein the waveguide layer comprises a second integrated waveguide for guiding a second light signal, the second integrated waveguide being arranged such that the cavity also terminates the second integrated waveguide in the region spaced away from the edges of the waveguide layer, and wherein a second reflective surface is provided in the cavity to reflect the second light signal when guided by the second integrated waveguide toward a second photodetector of the planar detector.

6. The photonic integrated circuit device of claim 5, wherein the waveguide layer comprises a third integrated waveguide and a fourth integrated waveguide for guiding respectively a third light signal and a fourth light signal, wherein the cavity terminates the third integrated waveguide and the fourth integrated waveguide, and wherein a third reflective surface and a fourth reflective surface are provided in the cavity to reflect respectively the third light signal and the fourth light signal when guided by respectively the third integrated waveguide and the fourth integrated waveguide toward respectively a third photodetector and a fourth photodetector of the planar detector.

7. The photonic integrated circuit device of claim 6, wherein the first integrated waveguide, the second integrated waveguide, the third integrated waveguide and the fourth integrated waveguide are arranged in a cross shape, the cavity being formed in an intersection of the cross shape.

8. The photonic integrated circuit device of claim 6, wherein the first integrated waveguide, the second integrated waveguide, the third integrated waveguide and the fourth integrated waveguide are arranged parallel to each other, wherein the first integrated waveguide and the second integrated waveguide are arranged in line with each other and wherein the third integrated waveguide and the fourth integrated waveguide are arranged in line with each other, the cavity comprising an elongate trench terminating the first, second, third and fourth integrated waveguides.

9. The photonic integrated circuit device of claim 8, wherein the elongate trench is oriented perpendicular to the first, second, third and fourth integrated waveguides, and wherein the first integrated waveguide and the second integrated waveguide lie at opposite sides of the elongate trench, and wherein the third integrated waveguide and the fourth integrated waveguide lie at opposite sides of the elongate trench.

10. The photonic integrated circuit device of claim 9, further comprising at least one light input coupler for coupling an input optical signal into the first, second, third and/or fourth integrated waveguide, wherein each of the at least one light input coupler is adapted for coupling light incident on the waveguide layer into integrated waveguide segments that lie at opposite sides of the light input coupler.

11. The photonic integrated circuit device of claim 10, wherein a plurality of elongate trenches and a plurality of light input couplers alternate in a parallel arrangement, the photonic integrated circuit device further comprising a plurality of photonic signal processors arranged in and/or functionally coupled to the integrated waveguides to manipulate a spectrum of the light travelling through the integrated waveguide between a light input coupler and an elongate trench.

12. A spectrometer comprising a photonic integrated circuit device according to claim 1.

13. The photonic integrated circuit device of claim 1, further comprising an amorphous silicon bridge disposed between the first integrated waveguide and the first reflective surface.

* * * * *